Aug. 26, 1958   R. D. BERG   2,848,787
BURRING TOOL
Filed Nov. 22, 1954
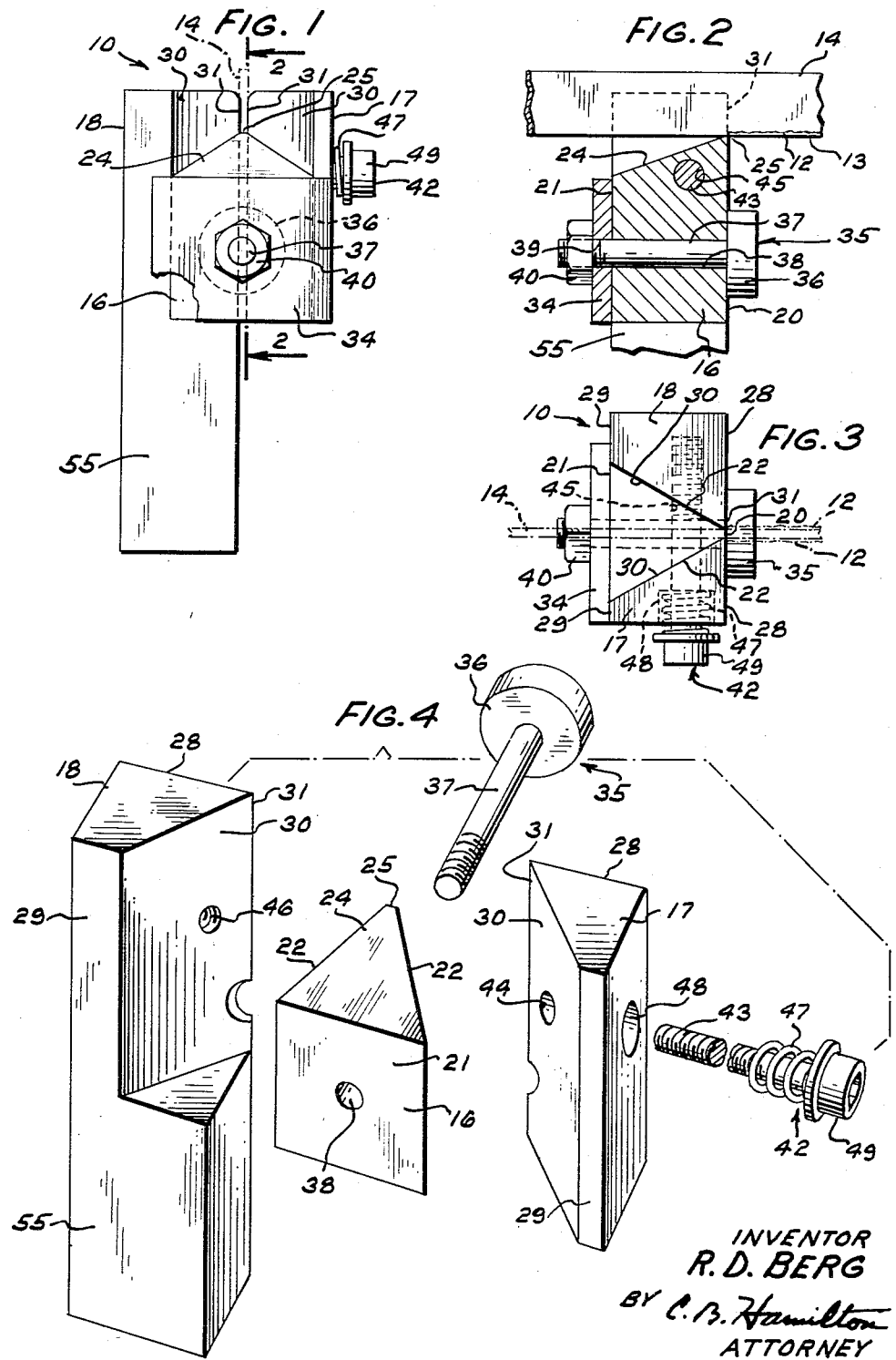
INVENTOR
R. D. BERG
BY C. B. Hamilton
ATTORNEY 2,848,787
Patented Aug. 26, 1958

2,848,787
BURRING TOOL

Richard D. Berg, Westchester, Ill., assignor to Western Electric Company, Incorporated, New York, N. Y., a corporation of New York Application November 22, 1954, Serial No. 470,399

4 Claims. (Cl. 29—95)

This invention relates to burring tools and more particularly to a composite burring tool, the components of which have cutting edges in a predetermined spaced relation to each other and may be readily disassembled for sharpening the cutting edges and reassembled with the cutting edges in the same precise position relative to each other.

An object of the invention is to provide a burring tool of simple construction with cutting edges which may be readily sharpened.

Another object of the invention is to provide a composite burring tool having components which have cutting edges in a predetermined relation to each other and which may be readily removed, sharpened, and reassembled with the cutting edges in the same precise relation to each other.

A device for removing the burrs from the corners of a flat surface ground on a bar and illustrating certain features of the invention may include a center and two end cutting members, each having a first flat face. The first flat face of the center member has a width substantially equal to that of the bar from which the burrs are to be removed and has a pair of second faces in diverging relation to each other extending from the side edges of the first face and has an obliquely disposed upper end face cooperating with the first face to form a horizontal cutting edge. The end members each have a second flat face in diverging relation to the first face and forming a vertical cutting edge therewith and the end members are removably clamped to the opposite sides of the center member with the second faces of the end members abutting the diverging second faces of the center member and with the first faces of the center and the end members in coplanar alignment and with the cutting edges of the end members extending upwardly from the center member and the horizontal cutting edge thereof in parallel and predetermined spaced relation to each other to form a slot for receiving the bar having burrs for horizontal movement therethrough whereby the cutting edges serve to remove the burrs from the bar.

Other objects and advantages of the invention will become apparent by reference to the following detailed description and the accompanying drawings illustrating a preferred embodiment thereof, in which—

Fig. 1 is a front elevational view of the burring tool;

Fig. 2 is a fragmentary vertical sectional view of the tool taken along the line 2—2 of Fig. 1 and showing a part therein from which the burrs are to be removed;

Fig. 3 is a plan view of the burring tool; and

Fig. 4 is an exploded perspective view of some of the components of the burring tool.

The present burring tool 10 was designed to remove burrs 12 from opposite edges of a narrow flat surface 13 on a bar-like piece part 14 and comprises a center member 16 and a pair of end members 17 and 18. The center member 16 has a trapezoidal cross section as viewed from above with a pair of vertical parallel faces 20 and 21 and a pair of diverging side faces 22 disposed at an angle of 60° to the face 21. The face 20 of the center cutting member has a width substantially equal to the width of the piece part 14 from which the burrs are to be removed and the center member 16 has a flat upper end face 24 disposed obliquely to the face 20 and cooperating therewith to form a horizontal cutting edge 25.

Each of the end members also has a trapezoidal configuration as viewed from above with a pair of parallel flat faces 28 and 29 spaced apart a distance substantially equal to the distance between the faces 20 and 21 of the center member 16 and has obliquely disposed flat faces 30 disposed at an angle of 60° from the faces 28 to form vertical cutting edges 31. The end members 17 and 18 are adapted to be removably secured to opposite sides of the center cutting member 16 with the oblique faces 30 thereof in engagement with the diverging faces 22 on the center member and with portions of the end member and vertical cutting edges 31 extending upwardly beyond the center member 16 and the horizontal cutting edge 25 thereof.

The means for securing the three cutting members in assembled relation comprises a clamping plate 34 overlying portions of the three members 16, 17, and 18 and engageable with the faces 21 and 29 of the center and end members, respectively, and a clamping element 35, the enlarged flat head 36 of which overlies the three cutting members and engages the flat faces 20 and 28 of the center and end cutting members, respectively. The clamping element 35 has a threaded shank 37 which passes through apertures 38 and 39 in the center member 16 and the clamping plate 34, respectively, and cooperates with a nut 40 threaded thereon and engageable with the clamping plate 34 for drawing the head 36 and the plate 34, in tight engagement with the center member 16. The clamping plate 34 and the element 35 serve to hold the cutting members against movement relative to each other in a direction parallel with the shank 37 of the clamping element and in the direction of movement of the piece part 14 through the burring tool.

The distance between the flat parallel faces 28 and 29 of the end members 17 and 18 may be slightly less than the distances of the center piece to permit slight lateral movement of one or both of the end members between the clamping plate 34 and element 35. The end members 17 and 18 are yieldably held in engagement with the center member 16 by a screw 42, the shank 43 of which passes through an aperture 44 in the end member 17, an aperture 45 in the center member 16, and threadedly engages a threaded aperture 46 in the end member 18. A spring 47 disposed in a counterbored portion 48 of the aperture 44 and engaging the head 49 of the clamping screw serves to stress the end members 17 and 18 toward the center member 16 and yieldably maintain the three cutting members in engagement and assembled relation with each other. The end members are thus movable laterally relative to the center member and are guided by the converging surfaces 22 of the center member 16 and the flat surface of the head 36 into the V-shaped recess formed thereby and are yieldably maintained in predetermined positions with the cutting edges 31, 31 thereof in parallel and predetermined spaced relation to each other. As shown herein the end cutting member 18 is provided with a downwardly extending portion 55 by means of which the tool may be clamped in a vise or other supporting means in an operative position.

With the cutting members in assembled relation, the vertical cutting edges 31 are spaced apart a distance substantially equal to the width of the piece part 14 and cooperate with the horizontal cutting edge 25 to form a rectangular slot open at the top for receiving the piece part 14 therein. Thus, when it is desired to remove the burrs 12 from a part 14 or some similar part, the part is placed in the slot as shown in Figs. 2 and 3 with the part 14 in engagement with the cutting edges 25, 31, 31 and pulled therethrough. The cutting edges 31 of the end members serve to remove the burrs 12 as a part is pulled therethrough, and in the event that a portion of the burrs are deflected or deformed downwardly, the horizontal cutting edge 25 of the center member cooperates with the vertical cutting edges 31 to remove the burrs 12 from the part 14. When a part 14 of slightly larger size than standard is placed in the slot of the burring tool, one of the end members 17 or 18 will yield sufficient to accommodate it because of the spring 47.

When the cutting edges 25, 31, 31 get dull, the tool may be quickly disassembled, the flat faces 24, 30, 30 of the members 16, 17, and 18, respectively, may be ground to sharpen the cutting edges, and the members reassembled with the sharpened cutting edges 25, 30, 30 disposed in the same precise relation to each other as before sharpening.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A burring tool comprising an element having a first flat face with a pair of parallel edges and of a width substantially equal to that of a part from which the burrs are to be removed and having a pair of diverging flat faces extending from said edges, a pair of cutting members each having a pair of diverging flat faces forming a straight cutting edge, said cutting members being disposed with one flat face in engagement with one diverging face of the element and with the other flat face in coplanar alignment with said first face of the element and with the cutting edges extending beyond the cutting edge of said element to form a slot for guiding a part for movement therethrough and for removing the burrs therefrom, and means for securing said members to said element.

2. A burring tool comprising an element having a first flat face with a pair of parallel edges and of a width substantially equal to that of a part from which the burrs are to be removed and having a pair of diverging flat faces extending from said edges and having a flat end face disposed obliquely to said first flat face to form a cutting edge, a pair of members each having a pair of diverging flat faces forming a straight cutting edge, said members each being disposed with one flat face in engagement with one diverging face of the element and with the other flat face in coplanar alignment with first face of the element and with the cutting edge extending beyond the cutting edge of said element to form a slot for guiding a part for movement therethrough in engagement with the cutting edges for removing the burrs therefrom, means for supporting said members and said element against relative movement in a direction transversely of said first flat face and for guiding said members for movement parallel to said first face, and resilient means for urging said members against said element in a direction parallel to said first flat face.

3. A burring tool comprising an element having a first flat face with a pair of parallel side edges spaced apart a distance substantially equal to the width of a part from which the burrs are to be removed and having a pair of diverging flat faces extending from said side edges and having a flat end face disposed obliquely to said first face to form a cutting edge, a pair of members each having a pair of diverging flat faces forming a straight cutting edge, said members being disposed on opposite sides of said element with one flat face of each member in engagement with one diverging face of the element and with the other flat face in coplanar alignment with said first face of the element and with the cutting edges extending beyond the cutting edge of said element to form a slot for guiding a part for movement therethrough in engagement with said cutting edges for removing the burrs therefrom, and means for removably securing said members to said element.

4. A burring tool comprising an element having a first flat face with a pair of parallel side edges spaced apart a distance substantially equal to the width of a part from which the burrs are to be removed and having a pair of diverging flat faces extending from said side edges and having a flat end face cooperating with said first face to form a straight cutting edge, a pair of members each having a pair of diverging flat faces forming a straight cutting edge, said cutting members being disposed with one flat face in engagement with one diverging face of the element and with the other flat face in coplanar alignment with said first face of the element and with the cutting edges extending beyond the cutting edge of said element to form a slot for guiding a part there through in engagement with said cutting edges for removing the burrs therefrom, and means for removably securing said members to said element including means for preventing movement of said cutting members relative to said element in a direction transversely of said first face of said element and for yieldably holding said members against said element and guiding one of said members for movement in a direction parallel to said first face.

References Cited in the file of this patent

UNITED STATES PATENTS

| | | |
|---|---|---|
| 39,946 | Moore | Sept. 15, 1863 |
| 152,585 | Wells | June 30, 1874 |
| 304,472 | Townsend | Sept. 2, 1884 |
| 1,239,451 | Beltz | Sept. 11, 1917 |
| 1,439,370 | Lambert | Dec. 19, 1922 |
| 1,558,943 | Swanson | Oct. 27, 1925 |
| 1,575,184 | Smith | Mar. 2, 1926 |
| 2,281,230 | Blount | Apr. 28, 1942 |
| 2,619,881 | Dudley | Dec. 2, 1952 |